(12) United States Patent
Vipat et al.

(10) Patent No.: US 10,248,786 B2
(45) Date of Patent: Apr. 2, 2019

(54) PLATFORM SECURITY USING PROCESSOR ASSISTS

(71) Applicant: Intel Corporation, Santa Clara, CA (US)

(72) Inventors: Harshawardhan Vipat, San Jose, CA (US); Manohar R. Castelino, Santa Clara, CA (US); Barry E. Huntley, Hillsboro, OR (US); Kuo-Lang Tseng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 350 days.

(21) Appl. No.: 14/998,087

(22) Filed: Dec. 24, 2015

(65) Prior Publication Data

US 2016/0308903 A1    Oct. 20, 2016

Related U.S. Application Data

(60) Provisional application No. 62/149,042, filed on Apr. 17, 2015.

(51) Int. Cl.
| | | |
|---|---|---|
| *G06F 21/55* | (2013.01) | |
| *G06F 21/53* | (2013.01) | |
| *G06F 21/62* | (2013.01) | |
| *G06F 9/455* | (2018.01) | |

(52) U.S. Cl.
CPC ........ *G06F 21/552* (2013.01); *G06F 9/45541* (2013.01); *G06F 9/45558* (2013.01); *G06F 21/53* (2013.01); *G06F 21/629* (2013.01); *G06F 2009/45587* (2013.01)

(58) Field of Classification Search
CPC ..................................................... G06F 21/552
USPC .............................................................. 726/1
See application file for complete search history.

(56) References Cited

U.S. PATENT DOCUMENTS

| | | | | |
|---|---|---|---|---|
| 2014/0380009 A1* | 12/2014 | Lemay | .................. | G06F 12/145 711/163 |
| 2015/0332048 A1* | 11/2015 | Mooring | ............... | G06F 21/567 726/1 |

OTHER PUBLICATIONS

McAfee, "Root Out Rootkits: An inside look at McAfee Deep Defender", McAfee, 2012, 12 pages.

* cited by examiner

*Primary Examiner* — Jacob Lipman
(74) *Attorney, Agent, or Firm* — Jordan IP Law, LLC

(57) ABSTRACT

Systems, apparatuses and methods may provide for detecting an attempt by an operating system (OS) to access a non-OS managed resource and injecting, in response to the attempt, an access event into a platform security component via a guest kernel associated with the OS. Additionally, a response to the attempt may be made based on a policy response from the platform security component. In one example, the attempt is detected with respect to one or more extended page table (EPT) permissions set by a security virtual machine monitor (SVMM). Moreover, injecting the access event into the platform security component may include invoking a previously registered policy callback.

21 Claims, 4 Drawing Sheets

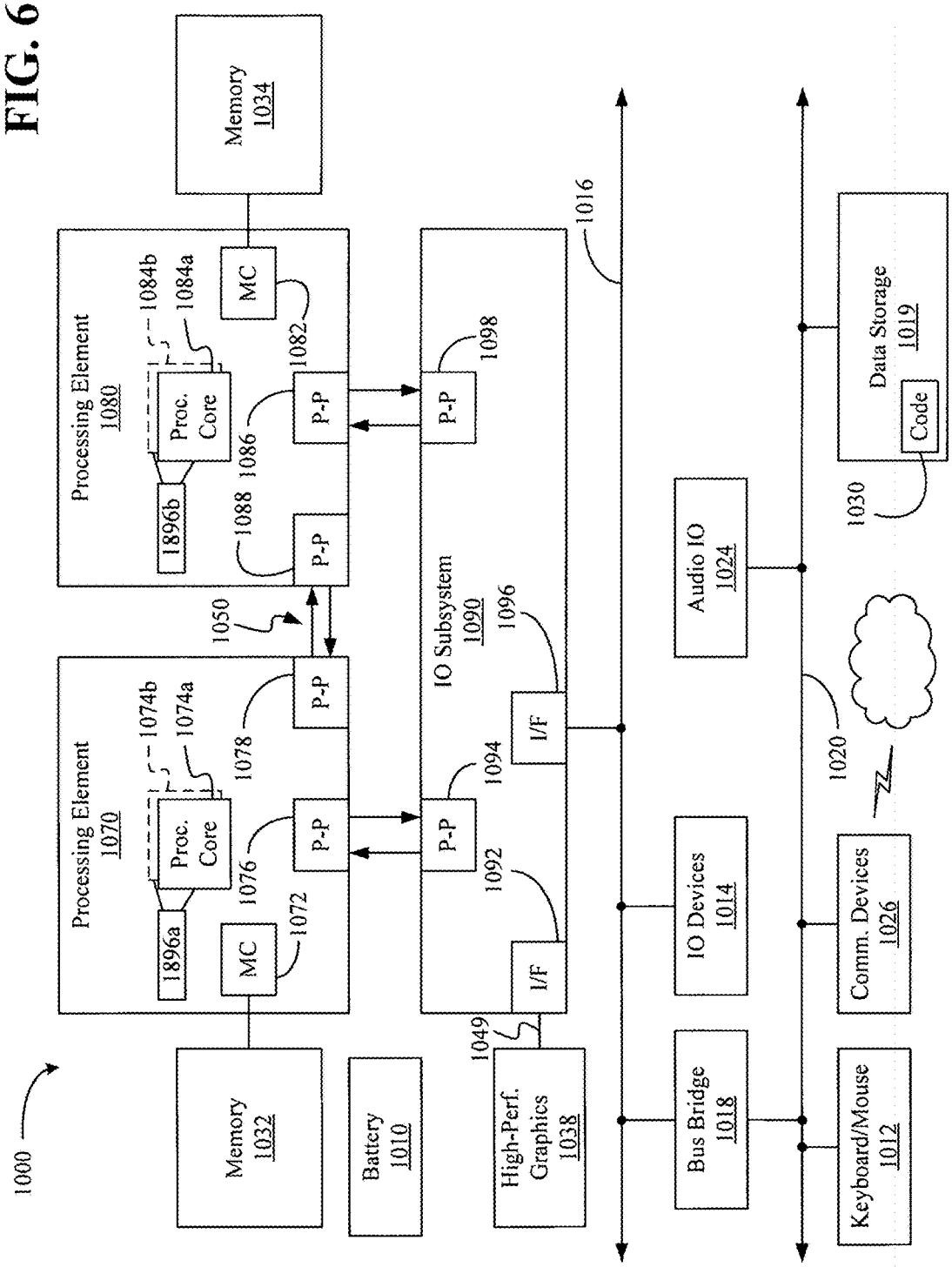

PLATFORM SECURITY USING PROCESSOR ASSISTS

CROSS-REFERENCE TO RELATED APPLICATIONS

This application claims the benefit of priority to U.S. Provisional Patent Application No. 62/149,042, filed on Apr. 17, 2015.

TECHNICAL FIELD

Embodiments generally relate to data security. More particularly, embodiments relate to platform security using processor assists.

BACKGROUND

Controlling access to critical assets and resources may be fundamental to operating system (OS) security. The decision to allow or disallow access may usually be policy specific and this logic therefore may not be implemented in the OS kernel. Modern operating systems may provide "hooks" that allow external policy code to be invoked when an OS managed asset or resource is accessed. For example, the LINUX OS may support LINUX Security Modules (LSMs), where a security module may register callbacks with the kernel. The kernel may then trap accesses to all of the key kernel objects and invoke the registered callback function to determine the policy decision to allow or deny access. Although existing LSM frameworks may allow controlling access to OS managed assets/resources, conventional solutions may not provide hooks or mechanisms for controlling access to non-OS resources such as CPU (central processing unit) and platform assets on which the kernel relies for secure operation.

BRIEF DESCRIPTION OF THE DRAWINGS

The various advantages of the embodiments will become apparent to one skilled in the art by reading the following specification and appended claims, and by referencing the following drawings, in which:

FIG. 6 is a block diagram of an example of a computing system according to an embodiment.

DESCRIPTION OF EMBODIMENTS

Figure 1:
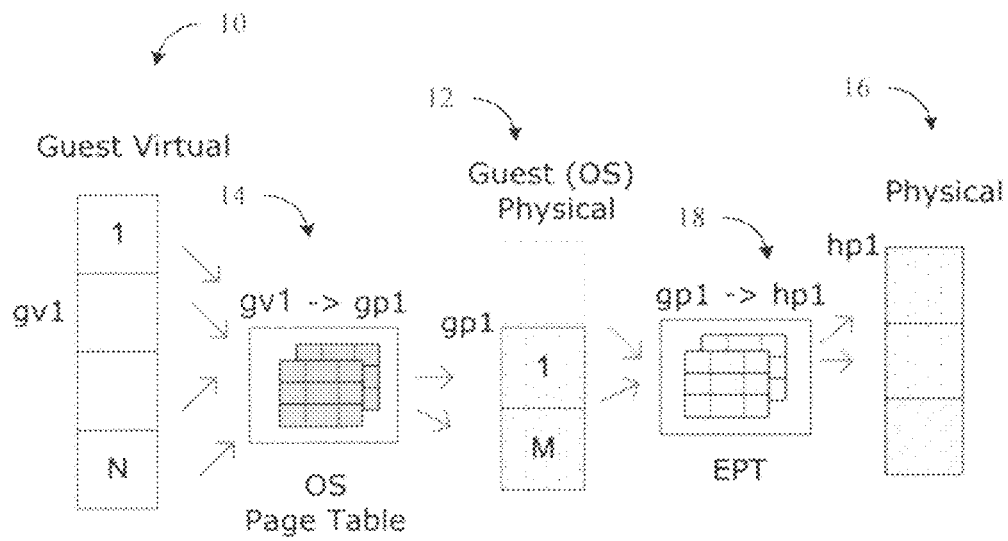
FIG. 1 is a block diagram of an example of an address mapping solution according to an embodiment.

Presented herein is a scheme that may be considered "platform LSM" to the extent that it extends the notion of LSM to providing protection to processor and platform assets. As a result, platform security and resiliency may be substantially increased.

In one example, a virtualization technology such as, for example, Virtualization Technology for CPU ("VTx", INTEL Corporation) and other new processor (e.g., host processor, CPU) assists such as "Virtualization Exceptions", trap attempted accesses (e.g., access events) to processor and platform resources. The access events may then be injected into a platform security component (e.g., module). The security module framework of the kernel may be extended to enable the platform security component to register callbacks for the processor/platform access events beforehand. Accordingly, when these events occur, the kernel may invoke the registered policy callbacks and take action based on the information returned by the policy module. The platform security component may also be implemented outside the OS (e.g., in VMS-root mode, discussed in greater detail below) and may enforce a pre-provisioned platform access control policy.

Using a virtualization technology such as, for example, VTx and other processor assists to protect platform assets on which the OS relies may be advantageous. The framework for generating events on access to platform resources, and either extending the existing LINUX LSM framework to deliver platform access events to an in-OS policy module, or to an outside-OS platform security module may also be advantageous. The techniques described herein extend the kernel security module framework to enable hardware enforced mandatory access control and protection of key processor and platform resources on which the kernel relies for secure operation. Such an approach may increase the security and resilience of the platform.

This scheme may be based on a virtualization solution such as, for example, virtual machine extensions (VMX, INTEL Corporation), Extended Page Table (EPT), processor assists available on processors such as, for example, INTEL CORE and ATOM processors. The next subsection provides a brief overview of these technologies and other background information.

BACKGROUND

VMX

VMX supports a special privilege mode referred to as VMX-root mode, which may be used to execute a privileged software component known as hypervisor or security virtual machine monitor (SVMM). The SVMM executes as a host, and has full control of processor and hardware resources. The operating system and corresponding ring/privilege structure, may be run as a guest in VMX non-root mode. In non-root mode, certain instructions and processor events may trigger hardware assisted transitions to VMX Root mode (e.g., exit controls such as virtual machine exits/VMExits), allowing the SVMM to monitor and control access to key CPU and platform resources.

EPT

Extended Page Table (EPT) supported by VTx-2 processors allows the SVMM to specify additional permissions for memory pages. The additional permissions may be enforced by hardware in an OS-independent fashion. When a violation of the permissions occurs, the control may be transferred to the SVMM (e.g., via EPT Violation VMExits), providing the SVMM an opportunity to intervene and trigger further actions.

FIG. 1 shows how virtual addresses 10 used by applications may be mapped to physical addresses 12 associated with a guest OS using an OS page-table 14. The guest physical addresses 12 may in turn be mapped to actual physical addresses 16 with the help of an EPT 18. The EPT 18 may specify permissions (e.g., set by the SVMM, which has a higher privilege level than the OS) for physical pages used by the guest OS. The EPT 18 may also carry translations of guest-physical addresses to host physical addresses.

VTx along with EPT may therefore facilitate monitoring and access control of key processor/platform resources such as control registers (CRs), mode specific registers (MSRs), base address registers (BARs), memory mapped input/output (MMIO) registers, extended feature enable registers (EFERs), specific memory regions, and so forth.

Although solutions may be described herein in the context of a LINUX operating system, the solutions are not specific to LINUX and may be used on other operating systems in a similar manner.

Example pre-conditions:

A boot loader/flow may be modified to load SVMM before the OS. The SVMM may run at a higher privilege in VMX-root. The OS may run in a de-privileged mode/state as a guest.

SVMM virtual machine control structure (VMCS) controls and an EPT may be setup appropriately to cause/trigger VMExits on access to monitored assets.

A kernel may be modified to support platform security hooks and delivery of access events A platform security component may be loaded, wherein the platform security component may and register access control callbacks with the kernel.

Figure 2:
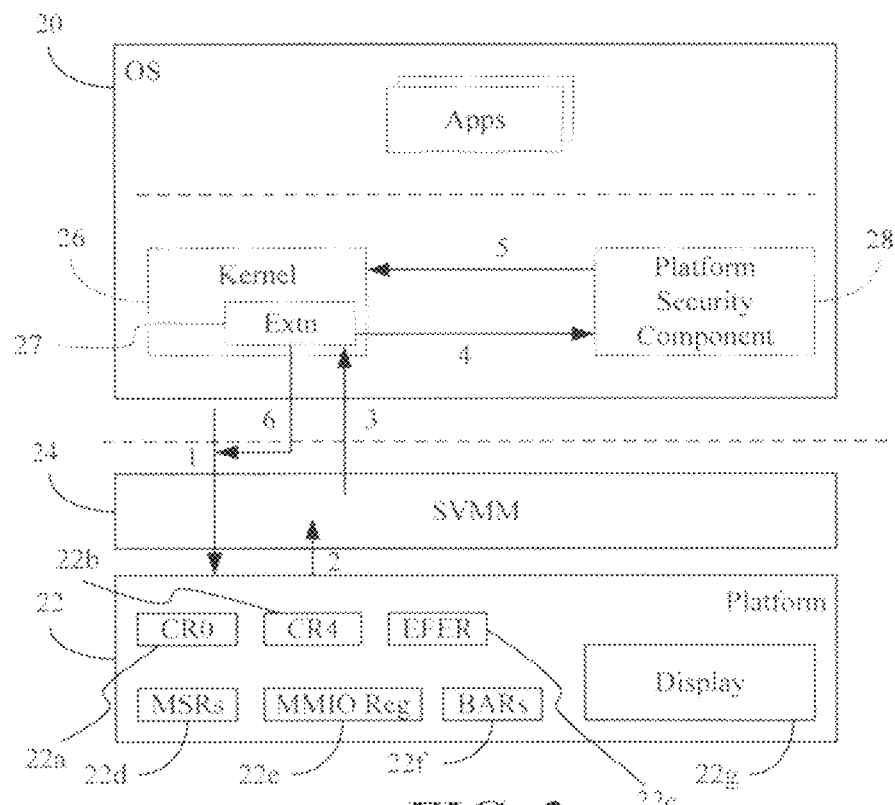
FIG. 2 is a block diagram of an example of a security stack according to an embodiment.

FIG. 2 shows an example sequencing in a security stack as described herein. In the illustrated example, an SVMM 24 operates between a platform 22 (22a-22g) and an OS 20. The platform 22 may include various non-OS managed resources such as, for example, a CR0 22a (e.g., control register zero), a CR4 22b (e.g., control register four), an EFER 22c (e.g., extended feature enable register), one or more MSRs 22d (e.g., mode specific registers), an MMIO register 22e (e.g., memory mapped input/output register), one or more BARs 22f (e.g., base address registers), a display 22g (e.g., liquid crystal display/LCD, organic light emitting diode/OLED display, touch screen, etc.), and so forth.

Example Sequencing:

1. The OS 20 (e.g., executing on a host processor/CPU) accesses a monitored resource or asset of the platform 22, wherein the resources/assets of the platform 22 are non-OS managed resources/assets. The display 22g may visually present information related to the attempt by the OS 20 to access the platform resource.

2. Hardware of the platform 22 transitions control to the SVMM 24 (e.g., via VMExit).

3. The SVMM 24 injects an access event into a guest kernel 26.

4. An extension component 27 of the guest kernel 26 invokes a previously registered policy callback to check the policy decision.

5. A platform security component 28 (e.g., policy code) communicates an action to the guest kernel 26.

6. The guest kernel 26 takes the specified action (e.g., announce/alert/panic, allow, skip, log, etc.) directly or using assistance provided by the SVMM 24.

The illustrated sequencing therefore provides policy based, hardware assisted mandatory access control of processor/platform assets.

Figure 3:
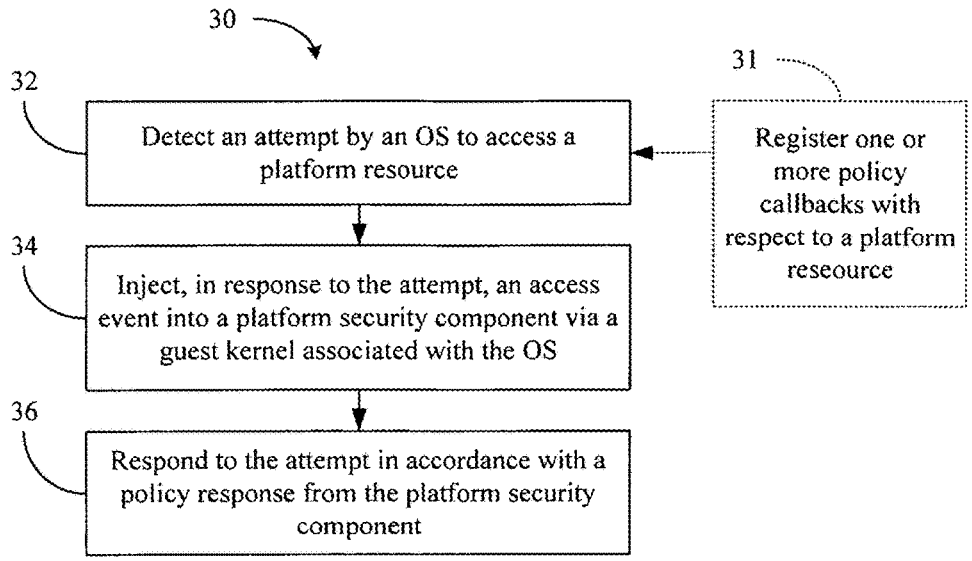
FIG. 3 is a flowchart of an example of method of operating a security assist apparatus according to an embodiment.

FIG. 3 shows a method 30 of operating a security assist apparatus. The method 30 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 30 may be written in any combination of one or more programming languages, including an object oriented programming language such as JAVA, SMALLTALK, C++ or the like and conventional procedural programming languages, such as the "C" programming language or similar programming languages.

Illustrated processing block 31 provides for registering one or more policy callbacks with respect to a platform resource. Each policy callback may generally include a piece of executable code that is passed as an argument to other code, which is expected to call back (e.g., execute) the argument at some convenient time. Illustrated block 32 detects an attempt by an operating system (OS) to access the platform resource, wherein block 34 may inject, in response to the attempt, an access event into a platform security component via a guest kernel associated with the OS. The attempt may be detected with respect to one or more EPT permissions and/or virtual machine exit controls (e.g., VMExits) set by an SVMM and injecting the access event into the platform security component may include invoking a previously registered policy callback.

Block 36 may provide for responding to the attempt in accordance with a policy response from the platform security component. Block 36 may include, for example, determining whether to one or more of permit the attempt (e.g., grant or deny), log the attempt, announce the attempt (e.g., trigger an alert/alarm), etc., or any combination thereof. As already noted, the attempt may be an attempt to access a non-OS managed resource such as, for example, a control register, mode specific register, base address register, MMIO register, extended feature enable register, etc., or any combination thereof.

Figure 4:
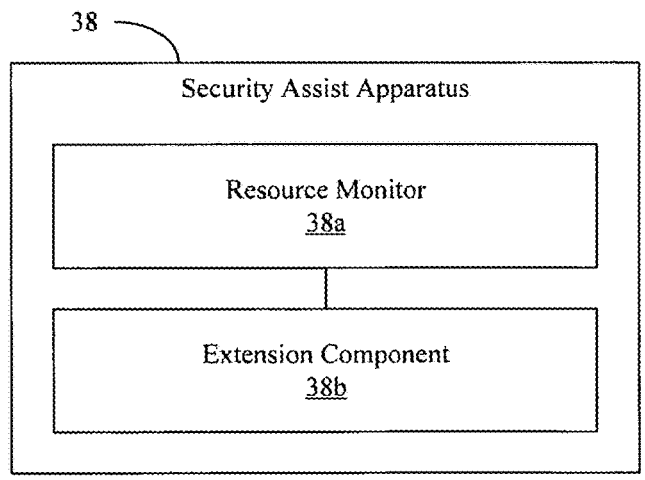
FIG. 4 is a block diagram of an example of a security assist apparatus according to an embodiment.

FIG. 4 shows a security assist apparatus 38 (38a, 38b). The apparatus, which may include logic instructions, configurable logic, fixed-functionality logic, etc., or any combination thereof, may generally implement one or more aspects of the method 30 (FIG. 3), already discussed. In the illustrated example, a resource monitor 38a detects an attempt by an OS to access a platform resource such as, for example, a control register, mode specific register, base address register, MMIO register, extended feature enable register, etc., or any combination thereof. The apparatus 38 may also include an extension component 38b communicatively coupled to the resource monitor 38a, wherein the extension component 38b is configured to inject, in response to the attempt, an access event into a platform security component. Moreover, a guest kernel (not shown) associated with the OS may respond to the attempt in accordance with a policy response from the platform security component.

The resource monitor 38a may detect the attempt with respect to one or more EPT permissions set by a SVMM. Additionally, the extension component 38b may invoke a previously registered policy callback to inject the access event into the platform security component. In this regard, the extension component 38b may register one or more policy callbacks with respect to the platform resource. Moreover, the guest kernel may determine whether to one or more of permit the attempt, log the attempt or announce the attempt based on the policy response.

Figure 5:
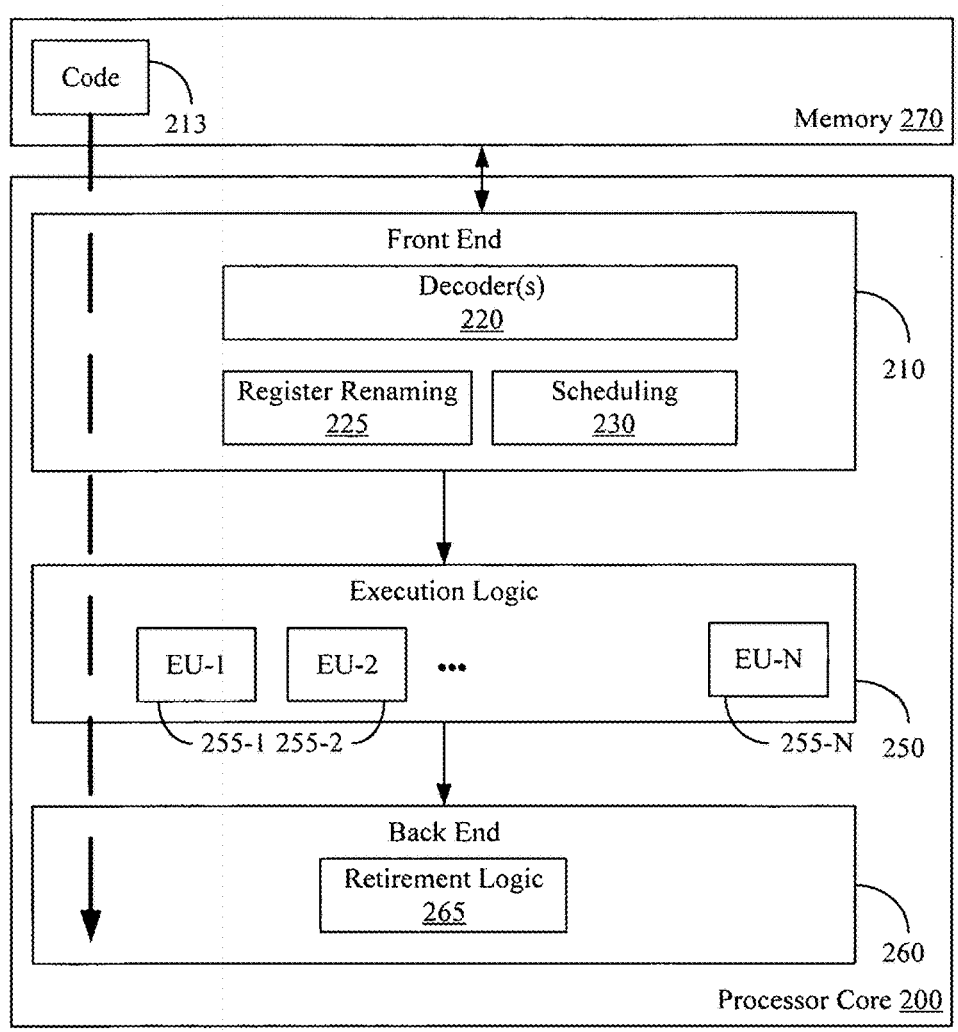
FIG. 5 is a block diagram of an example of a processor according to an embodiment.

FIG. 5 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 5, a processing element may alternatively include more than one of the processor core 200 illustrated in FIG. 5. The processor core 200 may be a single-threaded core or, for at least one embodiment, the processor core 200 may be multithreaded in that it may include more than one hardware thread context (or "logical processor") per core.

FIG. 5 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 30 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 5, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 6, shown is a block diagram of a computing system 1000 embodiment in accordance with an embodiment. Shown in FIG. 6 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 6 may be implemented as a multi-drop bus rather than point-to-point interconnect.

As shown in FIG. 6, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 5.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 6, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 6, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 6, various I/O devices 1014 (e.g., speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 30 (FIG. 3), already discussed, and may be similar to the code 213 (FIG. 5), already discussed. Further, an audio I/O 1024 may be coupled to second bus 1020 and a battery 1010 may supply power to the computing system 1000.

Note that other embodiments are contemplated. For example, instead of the point-to-point architecture of FIG. 6, a system may implement a multi-drop bus or another such communication topology. Also, the elements of FIG. 6 may alternatively be partitioned using more or fewer integrated chips than shown in FIG. 6.

ADDITIONAL NOTES AND EXAMPLES

Example 1 may include a security-enhanced computing platform comprising a platform resource, a host processor to execute an operating system (OS) and a guest kernel associated with the OS, a resource monitor to detect the attempt by the OS to access the platform resource, and an extension component communicatively coupled to the resource monitor, the extension component to inject, in response to the attempt, an access event into a platform security component, wherein the guest kernel is to respond to the attempt in accordance with a policy response from the platform security component.

Example 2 may include the platform of Example 1, wherein the attempt is to be detected with respect to one or more of an extended page table (EPT) permission or a virtual machine exit control set by a security virtual machine monitor (SVMM).

Example 3 may include the platform of Example 1, wherein the extension component is to invoke a previously registered policy callback to inject the access event into the platform security component.

Example 4 may include the platform of Example 1, wherein the guest kernel is to determine whether to one or more of permit the attempt, log the attempt or announce the attempt.

Example 5 may include the platform of Example 1, wherein the extension component is to register one or more policy callbacks with respect to the platform resource.

Example 6 may include the platform of any one of Examples 1 to 5, wherein the platform resource includes one or more of a control register, a mode specific register, a base address register, a memory mapped input/output register or an extended feature enable register.

Example 7 may include the platform of any one of Examples 1 to 5, further including a display to visually present information related to an attempt by the OS to access the platform resource.

Example 8 may include a security assist apparatus comprising a resource monitor to detect an attempt by an operating system (OS) to access a platform resource and an extension component communicatively coupled to the resource monitor, the extension component to inject, in response to the attempt, an access event into a platform security component, wherein a guest kernel associated with the OS is to respond to the attempt in accordance with a policy response from the platform security component.

Example 9 may include the apparatus of Example 8, wherein the attempt is to be detected with respect to one or more of an extended page table (EPT) permission or a virtual machine exit control set by a security virtual machine monitor (SVMM).

Example 10 may include the apparatus of Example 8, wherein the extension component is to invoke a previously registered policy callback to inject the access event into the platform security component.

Example 11 may include the apparatus of Example 8, wherein the guest kernel is to determine whether to one or more of permit the attempt, log the attempt or announce the attempt.

Example 12 may include the apparatus of Example 8, wherein the extension component is to register one or more policy callbacks with respect to the platform resource.

Example 13 may include the apparatus of any one of Examples 8 to 12, wherein the attempt is to access one or more of a control register, a mode specific register, a base address register, a memory mapped input/output register or an extended feature enable register.

Example 14 may include a method of operating a security assist apparatus comprising detecting an attempt by an operating system (OS) to access a platform resource, injecting, in response to the attempt, an access event into a platform security component via a guest kernel associated with the OS, and responding to the attempt in accordance with a policy response from the platform security component.

Example 15 may include the method of Example 14, wherein the attempt is detected with respect to one or more of an extended page table (EPT) permission or a virtual machine exit control set by a security virtual machine monitor (SVMM).

Example 16 may include the method of Example 14, wherein injecting the access event into the platform security component includes invoking a previously registered policy callback.

Example 17 may include the method of Example 14, wherein responding to the attempt includes determining whether to one or more of permit the attempt, log the attempt or announce the attempt.

Example 18 may include the method of Example 14, further including registering one or more policy callbacks with respect to the platform resource.

Example 19 may include the method of any one of Examples 14 to 18, wherein the attempt is to access one or more of a control register, a mode specific register, a base address register, a memory mapped input/output register, or an extended feature enable register.

Example 20 may include at least one computer readable storage medium comprising a set of instructions, which when executed by a computing platform, cause the computing platform to detect an attempt by an operating system (OS) to access a platform resource, inject, in response to the attempt, an access event into a platform security component via a guest kernel associated with the OS, and respond to the attempt in accordance with a policy response from the platform security component.

Example 21 may include the at least one computer readable storage medium of Example 20, wherein the attempt is to be detected with respect to one or more of an extended page table (EPT) permission or a virtual machine exit control set by a security virtual machine monitor (SVMM).

Example 22 may include the at least one computer readable storage medium of Example 20, wherein the instructions, when executed, cause a computing platform to invoke a previously registered policy callback to inject the access event into the platform security component.

Example 23 may include the at least one computer readable storage medium of Example 20, wherein the instructions, when executed, cause a computing platform to determine whether to one or more of permit the attempt, log the attempt or announce the attempt.

Example 24 may include the at least one computer readable storage medium of Example 20, wherein the instructions, when executed, cause a computing platform to register one or more policy callbacks with respect to the platform resource.

Example 25 may include the at least one computer readable storage medium of any one of Examples 20 to 24, wherein the attempt is to access one or more of a control register, a mode specific register, a base address register, a memory mapped input/output register or an extended feature enable register.

Example 26 may include a security assist apparatus comprising means for detecting an attempt by an operating system (OS) to access a platform resource, means for injecting, in response to the attempt, an access event into a platform security component via a guest kernel associated with the OS, and means for responding to the attempt in accordance with a policy response from the platform security component.

Example 27 may include the apparatus of Example 26, wherein the attempt is to be detected with respect to one or more of an extended page table (EPT) permission or a virtual machine exit control set by a security virtual machine monitor (SVMM).

Example 28 may include the apparatus of Example 26, wherein the means for injecting the access event into the platform security component includes means for invoking a previously registered policy callback.

Example 29 may include the apparatus of Example 26, wherein the means for responding to the attempt includes means for determining whether to one or more of permit the attempt, log the attempt or announce the attempt.

Example 30 may include the apparatus of Example 26, further including means for registering one or more policy callbacks with respect to the platform resource.

Example 31 may include the apparatus of any one of Examples 26 to 30, wherein the attempt is to access one or more of a control register, a mode specific register, a base address register, a memory mapped input/output register, or an extended feature enable register.

Thus, techniques described herein may use CPU assists to protect platform assets and create hardened and resilient platforms. Policy based, hardware assisted, mandatory access control for CPU/platform assets may result. The techniques may therefore be useful to security operating system vendors (OSVs), independent software vendors (ISVs), solution providers, backend/cloud and data center service providers, anti-malware solution companies, and so forth.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A platform comprising:
a platform resource;
a host processor to execute an operating system (OS) and a guest kernel associated with the OS;
a resource monitor to detect an attempt by the OS to access the platform resource; and
an extension component communicatively coupled to the resource monitor, the extension component to inject, in response to the attempt, an access event into a platform security component, wherein the guest kernel is to respond to the attempt in accordance with a policy response from the platform security component,
wherein the attempt is to be detected with respect to one or more of an extended page table (EPT) permission or a virtual machine exit control set by a security virtual machine monitor (SVMM).

2. The platform of claim 1, wherein the extension component is to invoke a previously registered policy callback to inject the access event into the platform security component.

3. The platform of claim 1, wherein the guest kernel is to determine whether to one or more of permit the attempt, log the attempt or announce the attempt.

4. The platform of claim 1, wherein the extension component is to register one or more policy callbacks with respect to the platform resource.

5. The platform of claim 1, wherein the platform resource includes one or more of a control register, a mode specific register, a base address register, a memory mapped input/output register or an extended feature enable register.

6. The platform of claim 1, further including a display to visually present information related to an attempt by the OS to access the platform resource.

7. An apparatus comprising:
a resource monitor to detect an attempt by an operating system (OS) to access a platform resource; and
an extension component communicatively coupled to the resource monitor, the extension component to inject, in response to the attempt, an access event into a platform security component, wherein a guest kernel associated with the OS is to respond to the attempt in accordance with a policy response from the platform security component,
wherein the attempt is to access one or more of a control register, a mode specific register, a base address register, a memory mapped input/output register or an extended feature enable register.

8. The apparatus of claim 7, wherein the attempt is to be detected with respect to one or more of an extended page table (EPT) permission or a virtual machine exit control set by a security virtual machine monitor (SVMM).

9. The apparatus of claim 7, wherein the extension component is to invoke a previously registered policy callback to inject the access event into the platform security component.

10. The apparatus of claim 7, wherein the guest kernel is to determine whether to one or more of permit the attempt, log the attempt or announce the attempt.

11. The apparatus of claim 7, wherein the extension component is to register one or more policy callbacks with respect to the platform resource.

12. A method comprising:
detecting an attempt by an operating system (OS) to access a platform resource;
injecting, in response to the attempt, an access event into a platform security component via a guest kernel associated with the OS; and
responding to the attempt in accordance with a policy response from the platform security component,
wherein the attempt is detected with respect to one or more of an extended page table (EPT) permission or a virtual machine exit control set by a security virtual machine monitor (SVMM).

13. The method of claim 12, wherein injecting the access event into the platform security component includes invoking a previously registered policy callback.

14. The method of claim 12, wherein responding to the attempt includes determining whether to one or more of permit the attempt, log the attempt or announce the attempt.

15. The method of claim 12, further including registering one or more policy callbacks with respect to the platform resource.

16. The method of claim 12, wherein the attempt is to access one or more of a control register, a mode specific register, a base address register, a memory mapped input/output register, or an extended feature enable register.

17. At least one computer readable storage medium comprising a set of instructions, which when executed by a computing platform, cause the computing platform to:
detect an attempt by an operating system (OS) to access a platform resource;
inject, in response to the attempt, an access event into a platform security component via a guest kernel associated with the OS; and
respond to the attempt in accordance with a policy response from the platform security component,
wherein the attempt is to access one or more of a control register, a mode specific register, a base address register, a memory mapped input/output register or an extended feature enable register.

18. The at least one computer readable storage medium of claim 17, wherein the attempt is to be detected with respect to one or more of an extended page table (EPT) permission or a virtual machine exit control set by a security virtual machine monitor (SVMM).

19. The at least one computer readable storage medium of claim 17, wherein the instructions, when executed, cause a computing platform to invoke a previously registered policy callback to inject the access event into the platform security component.

20. The at least one computer readable storage medium of claim 17, wherein the instructions, when executed, cause a computing platform to determine whether to one or more of permit the attempt, log the attempt or announce the attempt.

21. The at least one computer readable storage medium of claim 17, wherein the instructions, when executed, cause a computing platform to register one or more policy callbacks with respect to the platform resource.

* * * * *